UNITED STATES PATENT OFFICE.

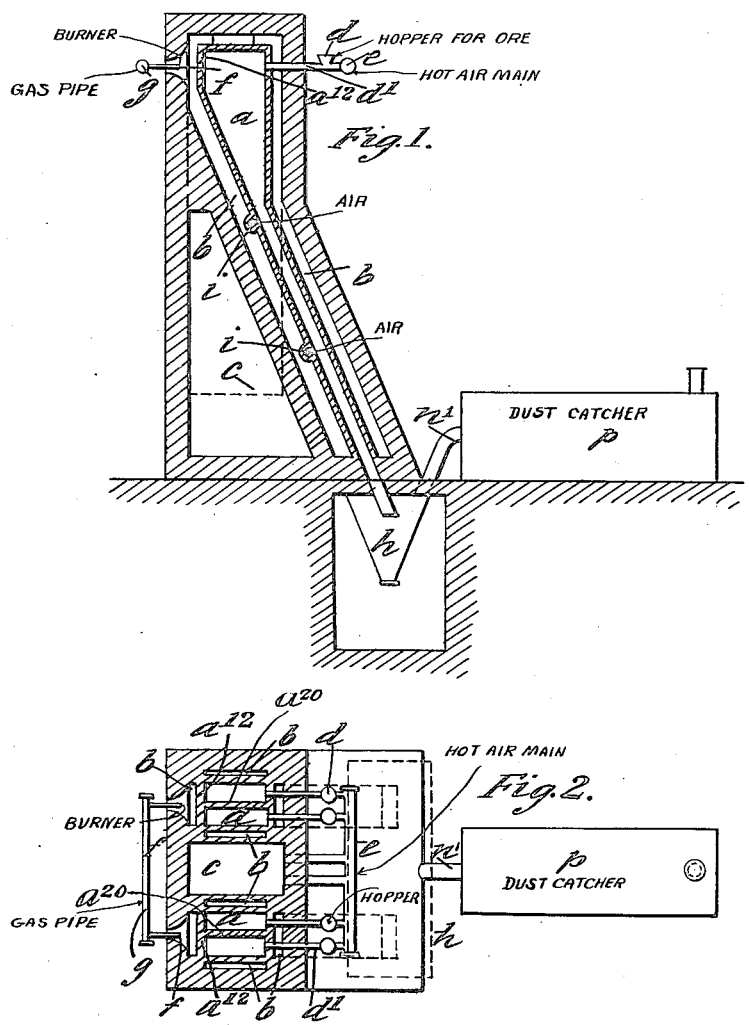

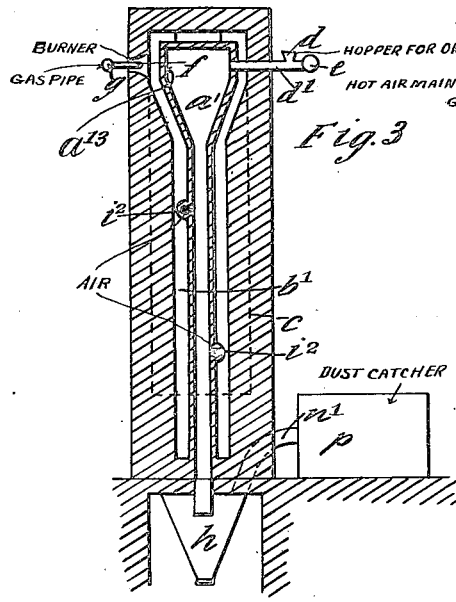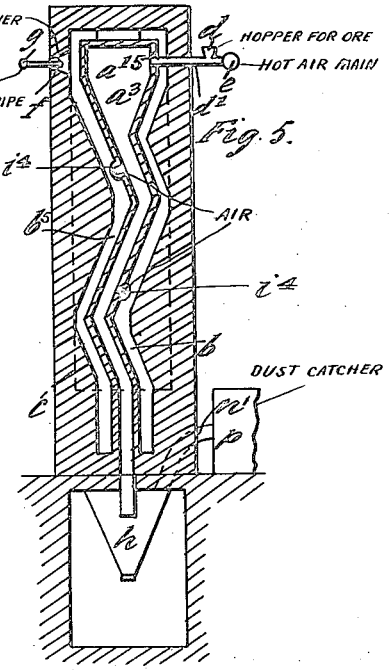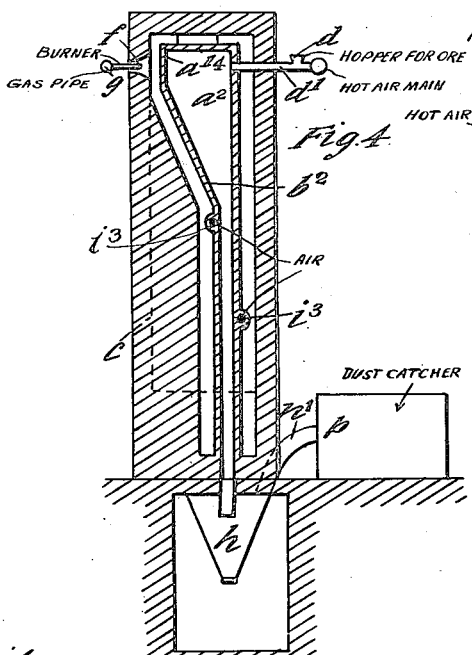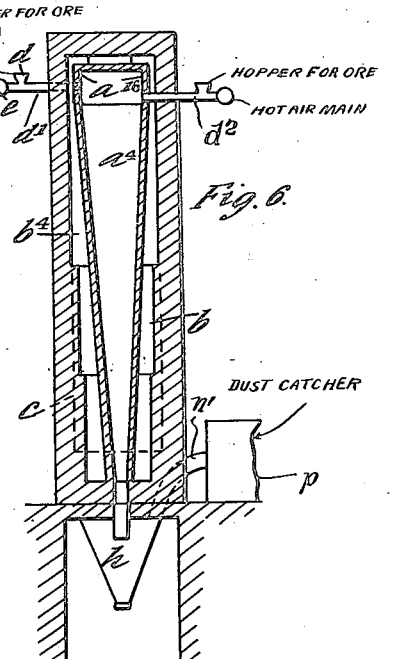

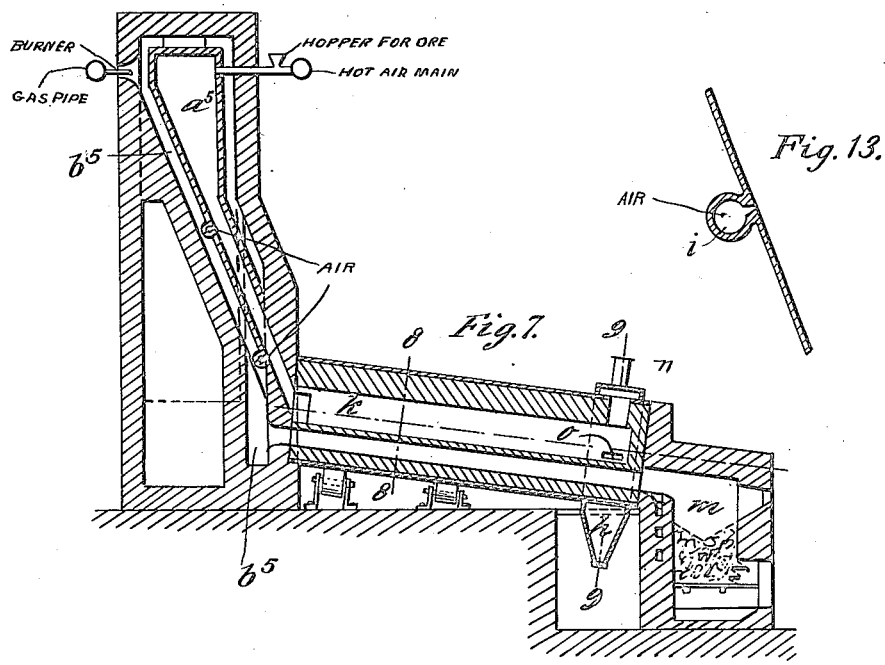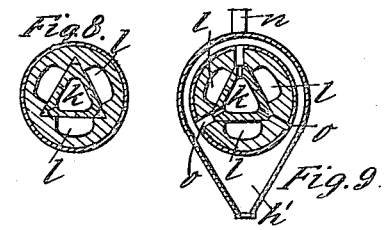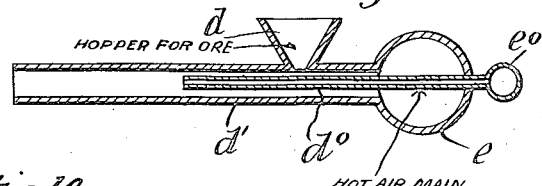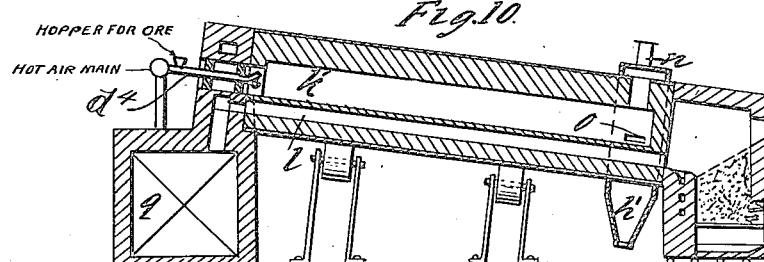

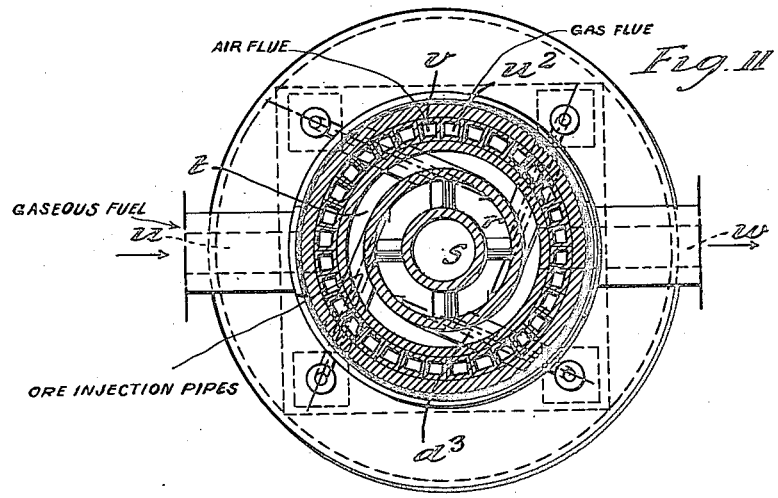
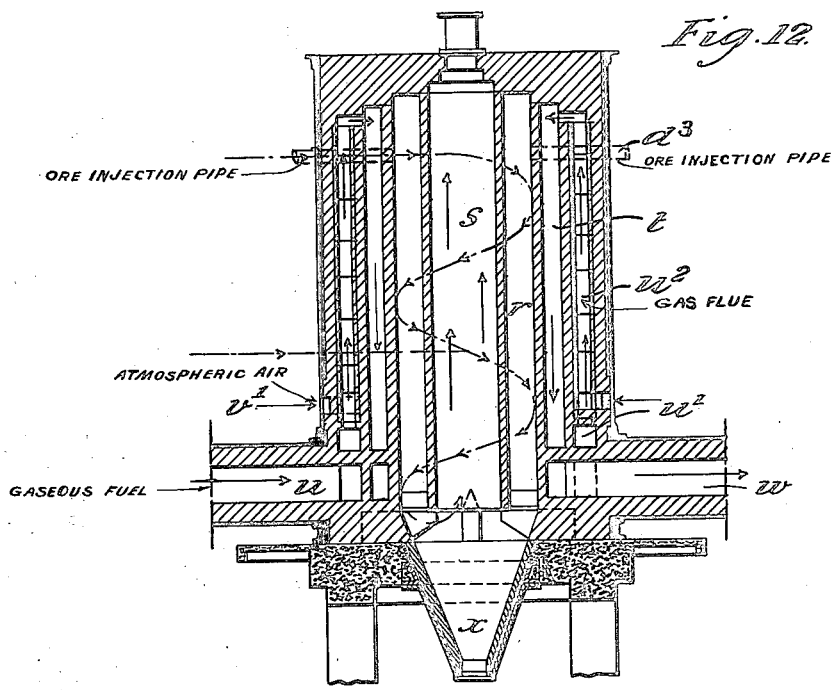

FRANK WILLIAM HARBORD, OF LONDON, ENGLAND.

ROASTING COMPLEX ZINC SULPHIDE ORES OR THE LIKE.

1,422,701.   Specification of Letters Patent.   Patented July 11, 1922.

Application filed February 13, 1919.   Serial No. 276,807.

*To all whom it may concern:*

Be it known that I, FRANK WILLIAM HARBORD, a subject of the King of Great Britain, residing in London, England, have invented certain new and useful Improvements in Roasting Complex Zinc Sulphide Ores or the like, of which the following is a specification.

In the roasting of complex zinc sulphide ores or concentrates, the material has a great tendency to sinter and unless the ore is continuously rabbled during the operation this sintering causes much trouble in the furnace.

By my invention the concentrate or ore is first treated to remove a portion of the sulphur under such conditions that sintering does not occur and is then roasted to remove the remaining sulphur to the required degree.

This preliminary treatment of partial roasting consists in injecting the finely sub-divided ore into a heated muffle chamber (which may be of any cross section and of uniform diameter or conical) against the incandescent surfaces with sufficient or more than sufficient supply of air to burn the desired proportion of the sulphur and in which the sulphur fumes are kept separate from products of combustion of fuel used for extraneous heating.

Special care is taken to control the temperature, so that fritting or semi-fusion does not occur in the muffle chamber and at the same time to secure as high a temperature as possible short of that which would volatilize oxides of lead and zinc.

It has been stated that sulphide ores can be caused to burn or oxidize by injecting the pulverized ore into a preliminarily heated chamber by means of a blast of air, and that with certain classes of ore the combustion is sufficiently exothermic to be self-supporting, so that the chamber needs to be heated only to start the process, although in many cases it is necessary to supplement the heat lost by radiation.

It has been proposed to supply the extraneous heat necessary by injecting with the ore into the ore chamber combustible material such as coal dust or coal gas or combustible gases but this retards the oxidation of the ore and makes the sulphur gases unsuitable for sulphuric acid manufacture, both of which are avoided by externally heating the ore chamber.

The complete roasting to the necessary degree without sintering may be performed in the same furnace as the preliminary roasting if the finely sub-divided ore or concentrate be injected together with the proportion of air suitable for the partial roasting into a muffle chamber of such construction that the injected ore will continue to travel down the chamber and there meet with the further quantity of air necessary for completing the roasting to the desired degree. The sulphur is sufficiently removed during the injection roast to prevent sintering of the ore during the passage down the furnace.

I have found that the oxidation of the sulphur is considerably increased if the finely divided ore when injected into the furnace is made to impinge upon the very highly heated surfaces and if, during the passage of the ore through the furnace, it is met by subsidiary jets of air under pressure, so arranged that it is subjected to a series of impingements against incandescent or highly heated surfaces, the roasting is still further facilitated and can in many cases be completed without the use of a second roasting chamber in combination with the injection furnace.

In cases, however, of some special ores, or when it is necessary to remove practically the whole of the sulphur, the final roast may be made in any suitable form of muffle roasting furnace into which the partially roasted ore from the injection furnace can be delivered direct. This finishing furnace may be of the horizontal rectangular or circular type, provided with suitable rabbles, but I prefer a vertical furnace combined with a rotary muffle furnace.

Instead of using a circular rotary or other form of hearth the ore, if incompletely roasted, may be delivered direct as it comes from the furnace into a hopper feed similar to that used in the first furnace and ejected into a second similar furnace, in which case two furnaces would be arranged to work together and the ore would be subjected to a double "injection" roast. In this latter case a convenient arrangement is to have the two furnaces arranged at different levels so that the ore from the first furnace falls direct into the hopper feed of the second furnace, but if preferred the furnaces can be on the same level and the ore from the first furnace elevated by any suitable means to the feed of the second furnace. In this arrangement the height of the first furnace may be reduced, and in some cases the subsidiary air jets dispensed with in this furnace.

In carrying out my invention, I inject the ore preferably at or near the top of the furnace, against some part of the heated surfaces of the furnace, the air injector being arranged with a high pressure small jet, surrounded with a large pipe for low pressure air, so that the ore and bulk of the air travel at different speeds.

The ore, after the first impingement, then falls on to a steeply inclined surface or direct into the vertical shaft of the furnace. The ore in travelling down the steep inclined surface and/or the vertical shaft, is met by subsidiary air jets of sufficient pressure to cause it to impinge on the highly heated walls of the furnace and finally is received into a suitable hopper or final roasting hearth. The furnace may be heated externally by producer gas, oil jets or in any convenient manner, and the air is heated to as high a temperature as possible by means of either suitable regenerators or recuperators heated by products of combustion. The sulphur gases after removal of heavy dust in depositing chamber and the fine dust in an electrostatic depositing plant are taken to the sulphuric acid plant.

Examples of muffle furnaces constructed in accordance with the foregoing experience are illustrated in the accompanying drawings.

Fig. 1 is a vertical section and Fig. 2 a sectional plan of one form of vertical furnace and Figs. 3, 4, 5 and 6 are vertical sections respectively of modified forms. Fig. 7 is a vertical section through a combination of a vertical furnace and an inclined rotary furnace, Fig. 8 being a section on line 8—8 of Fig. 7, and Fig. 9 a section on line 9—9 of Fig. 7. Fig. 10 is a longitudinal vertical section through an inclined rotary furnace. Fig. 11 is a horizontal section, Fig. 12 a vertical section through a cylindrical furnace in which the ore is injected tangentially to the inner periphery of the roasting chamber, Fig. 13 is a vertical sectional view, on an enlarged scale, of a portion of one of the walls of the heating chamber showing one of the supplemental air inlets, and Fig. 14 is a vertical sectional view showing a pair of co-axial pipes for delivering heated air at different pressures along with the ore or concentrate to the muffle chamber.

Referring to Figs. 1–6, the muffle chamber $a$, $a'$, $a^2$, $a^3$, or $a^4$ is set in heating flues $b$, $b'$, $b^2$, $b^3$ or $b^4$ for the combustion of gases supplied by a producer arranged in any suitable position. The products of combustion pass on their way from the flues through a recuperator or regenerator $c$ in which is heated the air for injecting the ore or concentrate. The latter is fed into a hopper $d$ and is carried through pipe $d'$ by the hot blast from the main $e$ and made to impinge principally against the surface $a^{12}$, $a^{13}$, $a^{14}$, $a^{15}$, or $a^{16}$ and to a smaller extent against the side walls and roof of the muffle chamber. In the furnace setting shown in Figs. 1–5 there is arranged a burner $f$ supplied with gas from a pipe $g$ so that the surface $a^{12}$, $a^{13}$, $a^{14}$ or $a^{15}$ may be highly heated. In Fig. 6, where the cross section of the chamber $a^4$ may be either circular or rectangular, are shown two pipes $d'$ $d^2$ for injecting the material; these are so arranged that the two streams of material are not in the same horizontal plane and impinge on opposite surfaces of the chamber. In the furnace, Figs. 1, 2, 3, 4 and 5, a partition wall like that shown at $a^{20}$ in Fig. 2 may be arranged between the two injecting jets to keep the ore streams separate and this partition wall may be continued to any desired distance down the furnace and may be built hollow with heating flues or solid according to temperature required.

It is convenient to build two such muffle chambers in a single setting as indicated in Fig. 2.

The muffle chamber has one or more inclined surfaces in the whole or part of its height down which the material slides before it falls into the hopper $h$. During its descent it meets with further jets of air injected through inlets $i$, $i^2$, $i^3$ or $i^4$ whereby it is subjected to a series of impingements on heated surfaces and the roasting is completed.

The quantity of air injected together with the material at the top of the chamber may be, for instance, about two-thirds of that necessary to roast the material, the remaining third being distributed among the inlets $i$, $i^2$, $i^3$ or $i^4$. Air is injected into the top of the furnace under two pressures, a small proportion at high pressure and a large proportion at a relatively low pressure, so that the greater part of the air is travelling at a different speed from the ore. Thus pipe $d'$ may contain a co-axial pipe $d^0$ fed by air from a main $e^0$ at higher pressure than that from the main $e$.

Poke holes (not shown) may be provided for removing any material which may hang in the chamber.

The proportion of sliding fall to direct fall for the material, that is to say, the proportion of inclined to vertical surface in the muffle chamber depends on the nature of the material, which in some cases is more easily roasted when in contact with a heated surface.

The products of combustion from the flues are taken off at the top to regenerators of which there are two, arranged with suitable reversing valves, so that one is being heated up by products of combustion, while air is passing through the other. Recuperators may be used, but as the air is under pressure, it is difficult to maintain the joints airtight and reversing regenerators are preferred.

In some cases the vertical chamber $a^5$ may be combined with a rotary inclined chamber $k$, as shown for example in Fig. 7.

This chamber has the form shown in Figs. 8 and 9. It is mounted to rotate in well-known manner, not indicated, and so that flues $l$ discharge the heating gases from furnace $m$ into the flues $b^5$ of the chamber $a^5$, while the material which has descended chamber $a^5$ may enter directly into the upper end of chamber $k$. The material discharges itself into hopper $h'$ and the gaseous products of the roasting are taken off by flue $n$ through ports $o$. The products of combustion from $b^5$ are taken off at any convenient position to regenerators for heating the air for injecting the ore.

Instead of a rotary muffle furnace for completing the roasting effected in the vertical furnace any known form of roasting furnace may be used, or a second vertical injection furnace may be used for completing the roast instead of the rotary or other form of roasting furnace, the ore from the first furnace being delivered direct, or conveyed by any suitable means, to the feeding hopper of the second furnace.

It is the primary object of my invention to roast ores, more particularly the material known as Broken Hill concentrates, so as to obtain gases directly suitable for the manufacture of sulphuric acid, so that whatever the form of muffle chamber the products of the roasting are led from the hopper $h$ through flue $n'$ to a dust catcher $p$ (indicated in Figs. 1–6), which may be of any known kind, and, after deposition of the heavier particles, finally to an electrostatic apparatus for completing the deposition of dust to required degree.

Although it is preferred to apply the invention in a vertical furnace or a combination of vertical furnace, and another furnace, it is also possible to avoid sintering in an inclined rotary furnace used alone, and in this form of furnace the material is injected against the hot surface of the muffle chamber which facilitates oxidation and removes sufficient sulphur on this preliminary roast to prevent subsequent sintering. Thus, as shown in Fig. 10, the pipe $d^4$ may be arranged to inject the material against the inner surface of the inclined rotary muffle chamber $k'$, the main air blast being, if desired, supplemented by air injected at the bottom end of the furnace to increase oxidation and complete the roasting. The products of combustion escape by flue $q$ and are taken to reversing regenerators for heating the air.

The furnace shown in Figs. 11 and 12 comprises a cylindrical roasting chamber $r$ having a co-axial internal flue $s$ and surrounded by an annular combustion chamber $t$. Gaseous fuel entering at $u$ passes into an annular flue $u'$ from which open a number of vertical flues $u^2$ surrounding the combustion chamber $t$. Alternating with these gas flues $u^2$ are air flues $v$ each closed at the bottom but having a lateral opening $v'$ for entrance of atmospheric air. The combustion chamber $t$ is open at bottom to the chimney flue $w$. The chimney draught draws gas up the flues $u^2$ and air up the flues $v$ into the combustion chamber $t$, where combustion begins at the top so that the highest temperature of the chamber $r$ is at its upper part where the material is injected in the manner already described by the tangentially placed pipes $d^3$. The material falls down the chamber $r$ in a gyratory path close to the inner surface of the outer wall of the chamber as indicated by arrows, and arrives in roasted condition in the hopper $x$, the products of the roasting and the dust passing away up the flue $s$ to a dust collector as aforesaid.

In any case it is advantageous to heat the material before it is injected into the muffle chamber to as high a temperature as possible without oxidizing the sulphur. Furthermore, instead of causing the material to impinge on the wall of the chamber a separate slab or block of heated fire-brick or the like may be provided in the chamber to receive the material, arranged so that they can be readily replaced when worn away by attrition.

Having thus described the nature of the said invention and the best means I know of carrying the same into practical effect, I claim:—

1. A process of roasting complex zinc sulphide ores or concentrates or zinc blends which consists in injecting the finely subdivided material by a blast of air against a surface within an externally heated muffle chamber which surface is heated to such a temperature as will partially roast the material at the part to the chamber where the injection occurs and then causing the material to travel within the chamber to complete the desired degree of roasting, substantially as and for the purpose set forth.

2. In the process referred to in claim 1, injecting the material into the upper part of the chamber by a blast of air to partially roast the material and injecting a further quantity of air at one or more points at a lower level in the chamber to complete such roasting.

3. The herein described process of roasting complex zinc sulphide ores or concentrates which comprises projecting such material in a finely divided condition in the presence of air, against a surface heated to a temperature sufficiently high to cause a desulphurizing action upon such material but insufficient to cause sintering of such material.

4. The herein described process of roasting complex zinc sulphide ores or concentrates or zinc blends which comprises projecting such material in a finely divided condition, into a closed chamber containing an oxidizing medium and against a surface heated to a temperature sufficiently high to cause a partial roasting of such material without sintering, and subjecting such material to a further oxidizing action within said closed chamber to complete the roasting thereof.

5. In the process of roasting complex zinc ores or concentrates or zinc blends as referred to in claim 1, locally heating the surface on which the ore is made to impinge when injected, to insure maintaining this surface in highly heated condition.

6. In a roasting apparatus, a combined vertical stationary muffle chamber and inclined rotary muffle chamber substantially as described.

7. In an apparatus for roasting complex zinc sulphide ores or concentrates or zinc blends, a muffle chamber having a surface provided with exteriorly located means for heating it and means for projecting such material, in a finely divided condition together with air against said heated surface.

In testimony whereof I have signed my name to this specification.

FRANK WILLIAM HARBORD.